United States Patent
Pan et al.

(10) Patent No.: US 10,205,789 B2
(45) Date of Patent: Feb. 12, 2019

(54) DETERMINING A PHYSICAL LOCATION OF A DEVICE

(71) Applicant: EMC Corporation, Hopkinton, MA (US)

(72) Inventors: Peter Yuanhang Pan, Shanghai (CN); Ted Huaqi Chen, Shanghai (CN); Haifang Zhai, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 421 days.

(21) Appl. No.: 15/190,518

(22) Filed: Jun. 23, 2016

(65) Prior Publication Data

US 2016/0381155 A1   Dec. 29, 2016

(30) Foreign Application Priority Data

Jun. 26, 2015   (CN) .......................... 2015 1 0363636

(51) Int. Cl.

| | | |
|---|---|---|
| *G06F 15/177* | (2006.01) | |
| *H04L 29/08* | (2006.01) | |
| *H04L 29/12* | (2006.01) | |
| *H04W 4/02* | (2018.01) | |
| *H04W 64/00* | (2009.01) | |
| *G06F 17/30* | (2006.01) | |
| *G06K 7/14* | (2006.01) | |

(52) U.S. Cl.
CPC .......... *H04L 67/18* (2013.01); *H04L 61/2015* (2013.01); *H04L 61/609* (2013.01); *G06F 17/30879* (2013.01); *G06K 7/1417* (2013.01); *H04W 4/02* (2013.01); *H04W 64/003* (2013.01)

(58) Field of Classification Search
CPC ... H04L 67/18; H04L 61/609; H04L 61/2015; H04W 4/02; H04W 64/003; G06F 17/30879; G06K 7/1417
USPC ................ 709/217, 218, 221, 224, 226, 230
See application file for complete search history.

(56) References Cited

U.S. PATENT DOCUMENTS

| | | | | |
|---|---|---|---|---|
| 2011/0074629 | A1* | 3/2011 | Khan ...................... | G01S 19/14 342/357.64 |
| 2012/0164969 | A1* | 6/2012 | Bhatia ................... | H04W 64/00 455/404.2 |
| 2012/0244875 | A1* | 9/2012 | Cardona ............... | G01S 5/0252 455/456.1 |
| 2013/0005352 | A1* | 1/2013 | Jones ..................... | G07B 15/00 455/456.1 |
| 2013/0087609 | A1* | 4/2013 | Nichol .............. | G06F 17/30002 235/375 |
| 2014/0006472 | A1* | 1/2014 | Brink .................... | G06F 3/1431 709/201 |
| 2016/0321530 | A1* | 11/2016 | Troy ..................... | G06F 3/1454 |

* cited by examiner

*Primary Examiner* — Liang Che A Wang
*Assistant Examiner* — Johnny B Aguiar
(74) *Attorney, Agent, or Firm* — BainwoodHuang (57) ABSTRACT

Embodiments of the present disclosure disclose a method, an apparatus and a computer program product for determining a physical location of a device by obtaining a first address of a device; and determining, based on a first mapping between the first address of the device and a location identifier of a physical location, the physical location of the device.

3 Claims, 5 Drawing Sheets

| SERIAL NUMBER | PHYSICAL LOCATION | BMC IP | BMC MAC |
|---|---|---|---|
| CF2GN143000006 | Hqp-171-82-F3-Lab4-Rack5-14U | 10.243.65.11 | 3C-97-0E-69-18-6E |
| CF2GN143000007 | Hqp-171-82-F3-Lab4-Rack5-18U | 10.243.65.15 | 3C-97-22-44-23-61 |
| CF2GN143000008 | SH-K1C2-F2-Lab1-Rack2-14U | 10.62.34.55 | 3C-33-54-12-6F-7A |
| CF2GN143000009 | SH-K1C2-F2-Lab1-Rack2-24U | 10.62.34.56 | 3C-4A-51-27-2B-BA |

DETERMINING A PHYSICAL LOCATION OF A DEVICE

RELATED APPLICATION

This application claim priority from Chinese Patent Application Number CN201510363636.7, filed on Jun. 26, 2015 at the State Intellectual Property Office, China, titled "METHOD AND APPARATUS FOR DETERMINING A PHYSICAL LOCATION OF A DEVICE," the contents of which is herein incorporated by reference in entirety.

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the present disclosure generally relate to locating a device.

BACKGROUND OF THE INVENTION

Generally, in a data center or a large lab, with an increase in the number of devices, tracking physical locations of devices (e.g., servers) may be crucial for system maintenance, hardware configuration change or trouble shooting. Information of physical locations of devices may be leveraged to achieve effective data center management, power save policies, and resource allocation.

SUMMARY OF THE INVENTION

Embodiments of the present disclosure provide a method and apparatus for determining a physical location of a device. According to one embodiment, there is provided a method for determining a physical location of a device by obtaining a first address of a device; and determining, based on a first mapping between the first address of the device and a location identifier of a physical location, the physical location of the device.

BRIEF DESCRIPTION OF THE DRAWINGS

The accompanying drawings here are used to provide further understanding of the present disclosure and thus constitute part of the present disclosure; the schematic embodiments of the present disclosure and their explanations are used for explaining the present disclosure, not constituting improper definition to the present disclosure. In the accompanying drawings.

In respective drawings, same or corresponding reference numerals represent same or corresponding parts.

DETAILED DESCRIPTION

Hereinafter, various exemplary embodiments of the present disclosure will be described in detail with reference to the accompanying drawings. It should be noted that these drawings and description relate only exemplary embodiments. It should be noted that based on subsequent depiction, alternative embodiments of the structure and method disclosed here can be easily contemplated, and these alternative embodiments may be used without departing from the principle as claimed in the present disclosure.

It should be understood that these exemplary embodiments are provided only to enable those skilled in the art to better understand and the further implement the present disclosure, not intended to limit the scope of the present disclosure in any manner.

The terms "comprise", "include" and the like used here should be understood as open terms, i.e., "comprise/include, but not limited to". The term "based on" means "at least partially based on". The term "one embodiment" indicates "at least one embodiment"; the term "another embodiment" indicates "at least one further embodiment". Relevant definitions of other terms will be provided in the description below.

In some embodiments, a method for determining a physical location of a device may include tracking a physical location of a device through an Internet protocol (IP) address. Generally, an IP address may be used to track on which device a software or application is running, and the IP address may be very straightforward to a lab operator. However, a drawback may be that due to introduction of dynamic IP address assignment by Dynamic Host Configuration Protocol (DHCP), it may become hard to track a physical device corresponding to an IP address; while if a fixed IP address is used for different locations, device migration may be prevented. Further, it may become rather inefficient to manage a database that maps IP addresses to locations. In addition, an IP address may not be used to distinguish devices on a same rack, which generally may require manual plug-in and plug-out of cables to determine specific locations of devices on the same rack.

In some other embodiments, a method for determining a physical location of a device may include an inventory scan. In a further embodiment, a bar code of a serial number of a device and a local tag indicating coarse location information may be scanned and stored in a database. However, drawbacks with this method may include that it may be unable to obtain an accurate location of a device, or a device being unaware of its own location, or it may be unable to map a serial number or location to an IP address generally used by an operator or user.

In some addition embodiments, Radio Frequency Identification Devices (RFID) may be used for communicating between a physical rack and a device, thereby obtaining location information of the device. In a further embodiment, a RFID reader may be installed on a rack to read an RFID tag of each device, and then location information of a device may be generated. However, such method may have a higher associated cost and a need for redesigning a rack or device. Further, additional manual operations may also needed so as to make a RFID reader close to a RFID tag.

Embodiments of the present disclosure provide a method and apparatus for determining a physical location of a device. According to one embodiment, there is provided a method for determining a physical location of a device by obtaining a first address of a device. A further embodiment may include determining, based on a first mapping between a first address of a device and a location identifier of a physical location, a physical location of the device. A further embodiment may include establishing a first mapping between a first address of a device and a location identifier of a physical location. A further embodiment may include in response to change of a physical location of a device, updating a first mapping.

In a further embodiment, establishing a first mapping between a first address of a device and a location identifier of a physical location may include establishing a second mapping between a device identifier of a device and a location identifier of a physical location. A further embodiment may include generating a first mapping based on a second mapping. In a further embodiment, generating a first mapping based on the second mapping may include obtaining a device identifier of a device based on a first address of the device. A further embodiment may include determining a location identifier of a physical location of a device based on a device identifier and a second mapping. A further embodiment may include generating a first mapping based on a first address and a location identifier. In a still further embodiment, determining a location identifier of a physical location of a device based on a device identifier and a second mapping may include writing a location identifier of a physical location of a device into the device.

In a further embodiment, in response to change of a physical location of a device, updating a first mapping may include obtaining a new location identifier of a new physical location of a device. A further embodiment may include updating a second mapping using a new location identifier. A further embodiment may include obtaining a new first address of a device. A further embodiment may include updating a first mapping based on an updated second mapping and a new first address.

In a yet further embodiment, the first address of the device is an IP address of the device, and the location identifier of the physical location includes a multi-level description of the physical location, the location identifier being marked at the physical location in a QR code format. In a further embodiment, a device identifier of the device may uniquely identify the device. In a further embodiment a device identifier may be stored in the device.

According to another aspect of the present disclosure, there is provided an apparatus for determining a physical location of a device. In one embodiment the apparatus may include a first address obtaining module that may be configured to obtain a first address of a device. A further embodiment may include a physical location determining module that may be configured to determine, based on a first mapping between a first address of a device and a location identifier of a physical location, a physical location of the device.

In one embodiment, the apparatus may include a first mapping establishing module that may be configured to establish a first mapping between a first address of a device and a location identifier of a physical location. In a further embodiment the apparatus may include a first mapping updating module that may be configured to, in response to change of a physical location of a device, update a first mapping.

In another embodiment, a first mapping establishing module may include a second mapping establishing unit that may be configured to establish a second mapping between a device identifier of a device and a location identifier of a physical location. In a further embodiment a first mapping generating unit may be configured to generate a first mapping based on a second mapping. In a further embodiment, a first mapping generating unit may be configured to obtain a device identifier of a device based on a first address of the device. In a further embodiment a first mapping generating unit may be configured to determine a location identifier of a physical location of a device based on a device identifier and a second mapping. In a further embodiment a first mapping generating unit may be configured to generate a first mapping based on a first address and a location identifier. In a still further embodiment, determining a location identifier of a physical location of a device based on a device identifier and a second mapping may include writing a location identifier of a physical location of a device into the device.

In a further embodiment, a first mapping updating module may include a location identifier obtaining module that may be configured to obtain a new location identifier of a new physical location of a device. In a further embodiment a second mapping updating unit may be configured to update a second mapping using a new location identifier. In a further embodiment a first address obtaining unit may be configured to obtain a new first address of a device. In a further embodiment a first mapping updating unit may be configured to update a first mapping based on a updated second mapping and a new first address.

In a yet further embodiment, a first address of a device may be an IP address of the device, and a location identifier of a physical location may include a multi-level description of the physical location. In a further embodiment a location identifier may be marked at a physical location in a QR code format. In a further embodiment, a device identifier of a device may uniquely identify the device, and a device identifier may be stored in the device.

A further embodiment may include a computer program product for determining a physical location of a device, the computer program product being tangibly stored on a non-transient computer-readable medium and including computer executable instructions that, when being executed, cause the computer to perform any step of the method disclosed above.

Embodiments of the present disclosure may be able establish a mapping relationship between a physical location of a device and an IP address, thereby allowing determination of a physical location of a device through an IP address. In a further embodiment, meanwhile, a QR code may be introduced to indicate a specific physical location, obviating a need to make any hardware change.

Hereinafter, a technical solution of determining a physical location of a device according to the embodiments of the present disclosure will be described in detail with reference to the accompanying drawings.

Figure 1:
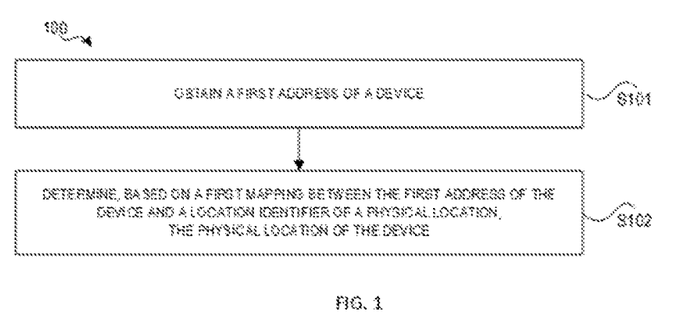
FIG. 1 illustrates a flow diagram of a method 100 for determining a physical location of a device according to one exemplary embodiment of the present disclosure.

Reference is made to FIG. 1, in which a flow diagram of a method 100 for determining a physical location of a device according to one exemplary embodiment of the present disclosure is presented. The method 100 comprises step S101 to step S102. In step S101, obtain a first address of a device. Next, the method 100 proceeds to step S102. In step S102, determine, based on a first mapping between the first address of the device and a location identifier of a physical location, the physical location of the device According to an embodiment, a first address may be an Internet Protocol (IP) address of a device. In an example embodiment, for a server device in a data center, a first address may be an IP address of a baseboard management controller (shortly referred to as BMC). In a further embodiment, in practice, when a device fails or its configuration needs to be changed, an operator or user may obtain an IP address of a device, and determine a physical location of the device based on the IP address of the device.

According to an embodiment, a location identifier of a physical location may include a multi-level depiction of a physical location, e.g., it may include a name of the city where it is located, a name of a building, a floor, a specific room number, a rack serial number, a unit serial number on the rack, etc. Hereinafter, embodiments with respect to FIG. 2 will be referenced to specifically describe a location identifier of a physical location. According to certain embodiments, an identifier of a physical location may be stored in a format of QR code and marked at a corresponding geographical location, e.g., on each rack unit of the rack or on a ground in front of the rack, etc. In a further embodiment, a first mapping between a first address of a device and a location identifier of a physical location may be specifically described with reference to FIG. 3 hereinafter.

In certain embodiments, as discussed below, a first mapping between a first address of a device and a location identifier of a physical location may be established, and for example, the first mapping may be stored in a uniform database at a cloud end of a data center. In a further embodiment, based on a first mapping, a specific location of a device may be determined through an IP address of the device. In an additional embodiment, a specific location of a device may be presented to a user in different forms based on a multi-level depiction of a physical location included in a location identifier, e.g., displaying a location identifier on a screen, or displaying a specific location of a device in a data center through a web page based on a three-dimensional (3D) rendering technology, etc.

According to an embodiment, method 100 may further include establishing a first mapping between a first address of a device and a location identifier of a physical location. In a further embodiment method 100 may include updating a first mapping in response to change of a physical location of a device.

According to one embodiment, establishing a first mapping between a first address of a device and a location identifier of a physical location may include establishing a second mapping between a device identifier of the device and the location identifier of the physical location. In a further embodiment, a device identifier of a device may be a serial number that uniquely identifies the device, e.g., the serial number is in a form of a bar code. In a further embodiment, when a device is deployed in a data center or a large lab, a second mapping between a device identifier of the device and the location identifier of the physical location may be established by scanning a serial number of the device and the location identifier (e.g., the location identifier in a QR code format) of the physical location (e.g., a rack, or a certain rack unit on the rack) where the device will be placed, the second mapping indicating a correspondence relationship between the device identifier and the location identifier.

According to one embodiment, establishing a first mapping between a first address of the device and a location identifier of a physical location may include generating a first mapping based on a second mapping. In a further embodiment, an operation of generating a first mapping may include obtaining a device identifier of a device based on a first address of the device. In an example embodiment, for a server device in a data center, IP addresses of all BMCs in the data center may be scanned from a specific server through a remote certificate mapping protocol (RCMP); or, all active IP addresses in a given network segment may be determined by querying a DHCP server, and then for these active IP addresses, it may be determined whether or not they are IP addresses in the BMC in succession. In a further embodiment, in this way, IP addresses of all target devices may be determined. In a further embodiment, based on an IP address of a device, a MAC address and the device identifier of the device may be obtained, e.g., uniquely identifying a serial number of the device. In an example embodiment, for a server device in a data center, a serial number of a server may be obtained through an intelligent platform management interface (IPMI) over Ethernet, e.g., a serial number may be stored in an erasable programmable read-only memory (EPROM or flash memory, generally referred to VPD or resume) within a server, and the serial number may be obtained through a BMC in the server via the IPMI command In a further embodiment, a MAC address of a device may be obtained in a plurality of ways based on an IP address of the device. In an example embodiment, MAC address may be obtained through a "nbtstat-a ip" command within a same local area network, or may be obtained by first using a "ping ip" command and then using a "arp-a" command. In a further embodiment, based on a device's device identifier and a second mapping, a location identifier of a physical location of a device is determined. In a further embodiment, a second mapping between a device identifier of a device and a location identifier of a physical location may be established. In a further embodiment, a location identifier of a physical address of a device may be determined based on a obtained device identifier of the device. In a further embodiment, for each device in all target devices, a first address of a device and a location identifier of a physical location of the device may be obtained, thereby generating a first mapping between a first address of the device and a location identifier of a physical location. In a further example embodiment, a first mapping may be stored in a uniform database at a cloud end of a data center. In a further embodiment, a first mapping between a first address of the device and a location identifier of a physical location will be described in detail with reference to FIG. 3.

According to one embodiment, determining a location identifier of a physical location of a device based on a device identifier and a second mapping may further include writing a location identifier of a physical location of a device into the device. In an example embodiment, for a server device in a data center, a location identifier may be written into a VPD or synopsis of a server through an IPMI command In a further embodiment, in this way, a device can know a physical location where it may be located.

According to one embodiment, updating a first mapping in response to change of a physical location of a device may include first, obtaining a new location identifier of a new physical location of a device. In an example embodiment, a new location identifier may be obtained by re-scanning a QR code deployed at a new physical location. In a further embodiment, a second mapping may be updated using a new location identifier. In a further embodiment, because a device identifier (e.g., a serial number) of a device uniquely identifies the device, a original second mapping may be updated through a device identifier and an obtained new location identifier. In a further embodiment, a new first address of a device may be obtained based on a second address of the device. In an example embodiment, for a server device in a data center, a first address and a second address may be an IP address and an MAC address of a BMC. In a further embodiment, a MAC address may be generally fixed, while an IP address may change with a change of a physical location of a device. In an example embodiment, a new IP address of a device may be obtained through an "arp-a" command based on a MAC address of the device. In a further embodiment, a first mapping may be updated based on an updated second mapping and a new first address.

Figure 2:
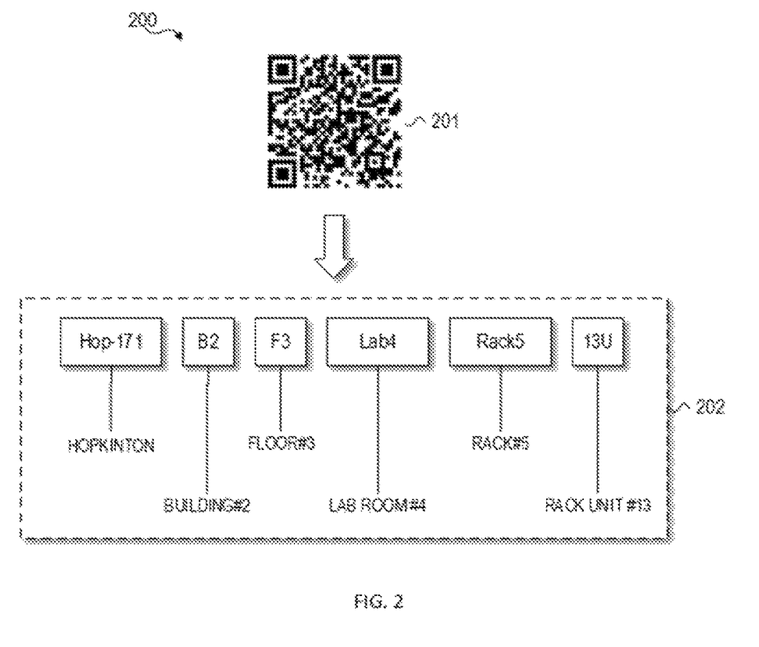
FIG. 2 illustrates a schematic diagram of a multi-level depiction of a physical location included in a location identifier in a QR code format according to an exemplary embodiment of the present disclosure.

Reference is now made to FIG. 2, which illustrates a schematic diagram of a location identifier in a QR code format and a multi-level depiction of a physical location included therein according to an exemplary embodiment of the present disclosure. FIG. 2 graphically represents a location identifier stored in QR code format 201, and the location identifier in the QR code format will be marked at a corresponding geographical location, e.g., on each rack unit of the rack or on the ground in front of the rack, etc. FIG. 2 graphically shows content 202 included in the location identifier as shown in 201, the content including a multi-level depiction of the corresponding geographical location, e.g., in the present example, including a name of the city (i.e., Hopkinton), a name of the building (i.e., building #2), a floor of the building (i.e., floor #3), a specific room (i.e., lab room #4), a rack number (i.e., rack #5), and a unit serial number on the rack (i.e., rack unit #13), etc.

Figure 3:
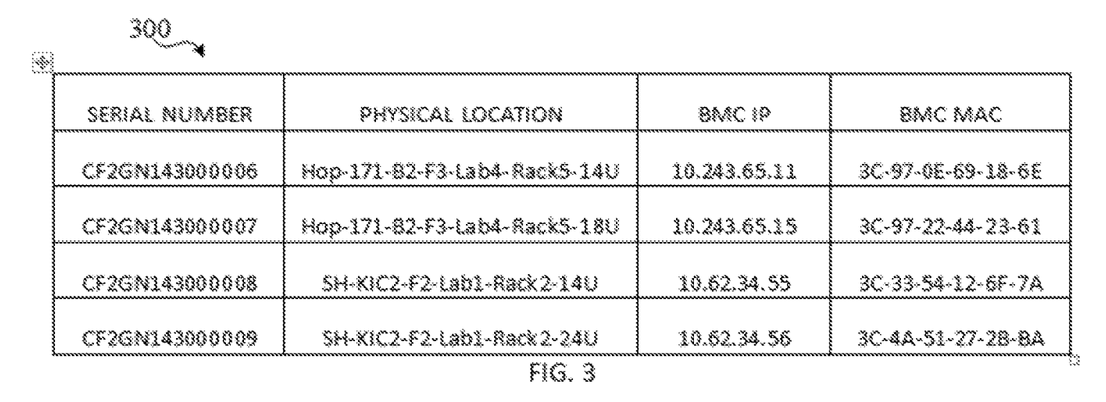
FIG. 3 illustrates a schematic diagram of a first mapping 300 of a first address and a second address of a device with a location identifier of a physical address, as established according to an exemplary embodiment of the present disclosure.

Reference is now made to FIG. 3, which illustrates a schematic diagram of first mapping 300 of a first address and a second address of a device with a location identifier of a physical address, as established according to an exemplary embodiment of the present disclosure. As shown in FIG. 3, a first column in first mapping 300 shows device identifiers (i.e., serial numbers) of the devices, the second column shows location identifiers of the physical locations of the corresponding devices, the third column shows first addresses of the corresponding devices (e.g., a BMC IP address for the server device in the data center), and the third column shows second addresses of the corresponding devices (e.g., BMC MAC addresses for the server device in the data center). In practice, when a device fails or it is needed to change its configuration, the operator or user may determine a specific location of the device through first mapping 300 based on an IP address of the device. In addition, a purpose of recording the second address of the device is recorded in first mapping 300 as, when the physical location of the device changes, the first address (IP address) of the device might vary therewith; and in this case, the new first address (e.g., IP address) of the device may be obtained based on the second address of the device.

Figure 4:
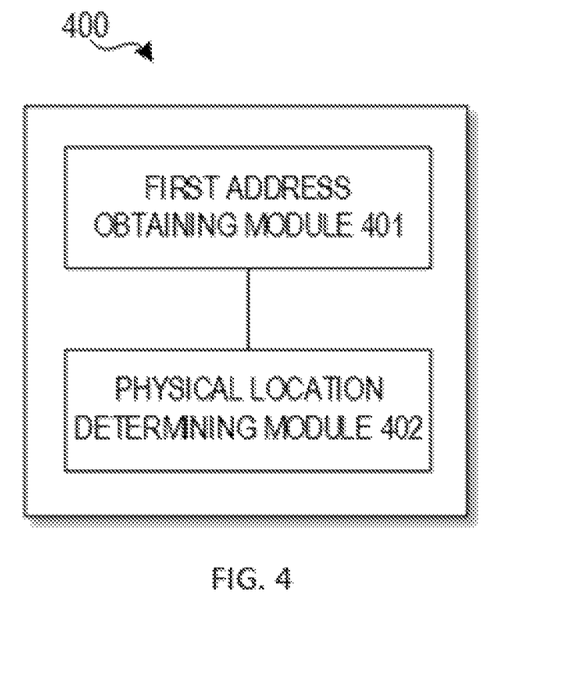
FIG. 4 illustrates a block diagram of an apparatus 400 for determining a physical location of a device according to an exemplary embodiment of the present disclosure.

Reference is now made to FIG. 4, which illustrates a block diagram of an apparatus 400 for determining a physical location of a device according to an exemplary embodiment of the present disclosure. Apparatus 400 includes first address obtaining module 401 configured to obtain a first address of a device; and physical location determining module 402 configured to determine, based on a first mapping between the first address of the device and a location identifier of a physical location, the physical location of the device.

According to one embodiment, apparatus 400 further includes a first mapping establishing module that may be configured to establish a first mapping between a first address of a device and a location identifier of a physical location. Apparatus 400 further includes a first mapping updating module that may be configured to, in response to change of a physical location of a device, update a first mapping.

According to one embodiment, a first mapping establishing module may include a second mapping establishing unit that may be configured to establish a second mapping between a device identifier of a device and a location identifier of a physical location. In a further embodiment a first mapping generating unit may be configured to generate a first mapping based on a second mapping.

According to one embodiment, a first mapping generating unit may be configured to: obtain a device identifier of a device based on a first address of the device. In a further embodiment first mapping generating unit may be configured to determine a location identifier of a physical location of a device based on a device identifier and a second mapping. In a further embodiment first mapping generating unit may be configured to generate a first mapping based on a first address and a location identifier, wherein determining a location identifier of a physical location of a device based on a device identifier and a second mapping may include writing a location identifier of a physical location of a device into the device.

According to one embodiment, a first mapping updating module may include a location identifier obtaining module that may be configured to obtain a new location identifier of a new physical location of the device. In a further embodiment a second mapping updating unit may be configured to update a second mapping using a new location identifier. In a further embodiment, a first address obtaining unit may be configured to obtain a new first address of a device. In a further embodiment a first mapping updating unit may be configured to update a first mapping based on a updated second mapping and a new first address.

According to one embodiment, a first address of a device may be an IP address of the device, and a location identifier of a physical location may include a multi-level description of a physical location. In a further embodiment, a location identifier may be marked at a physical location in a QR code format. In a further embodiment, a device identifier of the device uniquely identifies the device. In a further embodiment a device identifier may be stored in the device.

Figure 5:
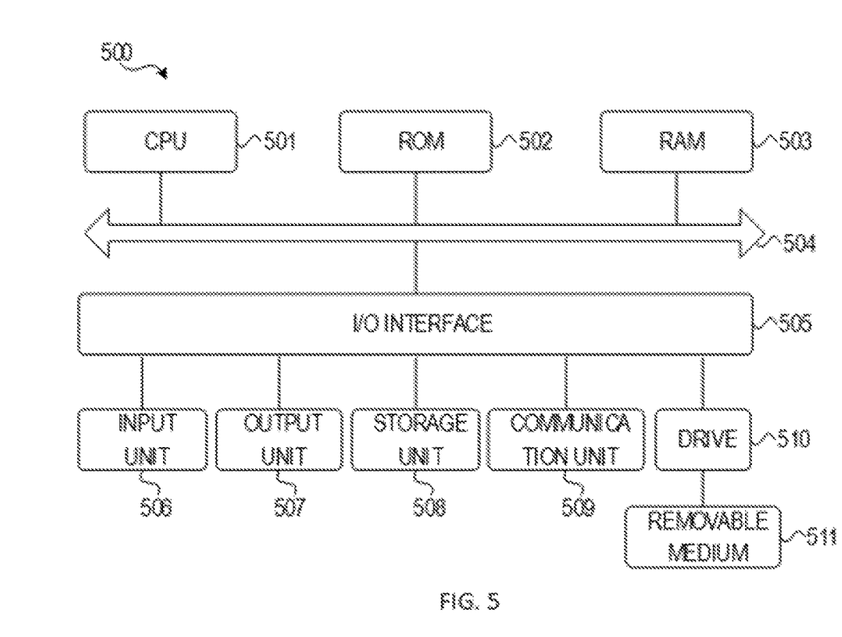
FIG. 5 illustrates a block diagram of a computer system 500 adapted to implement exemplary embodiments of the present disclosure.

Hereinafter, Reference is made to FIG. 5, in which a block diagram of computer system 500 adapted to implement exemplary embodiments of the present disclosure is schematically illustrated. As shown in FIG. 5, computer system 500 includes a central processing unit (CPU) 501, which may perform any proper actions and processing based on a program stored in read-only memory (ROM) 502 or a program loaded from memory section 508 to random access memory (ROM) 503. RAM 503, further store various programs and data needed for operations of apparatus 400 or apparatus 500. CPU 501, ROM 502, and RAM 503 are connected to each other via bus 504. Input/output (I/O) interface 505 is also connected to bus 504.

The following components are connected to I/O interface 505: an input part including a keyboard, a mouse and the like; output part 507 including a cathode ray tube (CRT), a liquid crystal display (LCD) and a loudspeaker, etc.; memory part 508 including a hard disk, etc.; communication part 509 including a network interface card such as LAN card, model, etc. Communication part 509 performs communication processing via a network such as Internet. Drive 510 may also be connected to I/O interface 505 as needed. Removable medium 511, such as a magnetic disk, an optic disk, a magneto-optical disk, a semiconductor memory, and the like, is mounted on drive 510 as required, such that a computer program read therefrom is mounted in storage part 508 as required.

In particular, according to embodiments of the present disclosure, method 100 described with reference to FIG. 1 may be implemented as computer software programs. For example, embodiments of the present disclosure include a computer program product that is tangibly stored on a non-transient computer-readable medium and comprises a computer executable instruction, the computer executable instruction, when being executed, causes the computer to perform any step of method 100.

In view of the above, according to embodiments of the present disclosure, there is provided a method and apparatus for implementing multiple content management service operations. Embodiments of the present disclosure may be able to establish a mapping relationship between a physical location of a device and an IP address, thereby allowing determination of a physical location of a device through an IP address; meanwhile, a QR code may be introduced to indicate a specific physical location, obviating a need to make any hardware change.

Generally, various exemplary embodiments of the present disclosure may be implemented in hardware or a specific circuit, software, logic, or any combination thereof. Some aspects may be implemented in hardware, while other aspects may be implemented in firmware or software executable by a controller, a microprocessor, or other computing device. When various aspects of the embodiments of the present disclosure are illustrated or described with block diagrams, flow diagrams or other graphical representations, it would be appreciated that the blocks, apparatuses, systems, technologies or methods described here may be implemented as non-limitative examples in hardware, software, firmware, specific circuit or logic, general hardware or controller or other computing device, or some combinations thereof.

Moreover, respective blocks in the flow diagram may be regarded as method steps, and/or operations generated by computer program code, and/or understood as a plurality of multiple logical circuit elements for performing relevant functions. For example, embodiments of the present disclosure include a computer program product that includes a computer program tangibly embodied on a machine readable medium, the computer program including program code configured to implement the above described methods.

Within the context of the present disclosure, a machine readable medium may be any tangible medium including or storing programs for or related to the instruction execution system, apparatus, or device. A machine readable medium may include, but not limited to, electronic, magnetic, optical, electro-magnetic, infrared or semiconductor system, apparatus or device, or any combination thereof. Mode detailed examples of machine-readable storage medium include an electric connection with one or more wires, a portable computer magnetic disk, hard disk, random access memory (RAM), read-only memory (ROM), erasable programmable read-only memory (EPROM or flash memory), optical storage device, magnetic storage device, or any appropriate combination thereof.

A computer program code for implementing methods of the disclosure may be compiled with one or more programming languages. These computer program code may be provided to a processor of a general computer, a dedicated computer or other programmable data processing device, such that the program code, when being executed by a computer or other programmable data processing device, causes functions/operations specified in the flow diagrams and/or blocks to be implemented. Program code may be executed completely on the computer, partially on the computer, as an independent software packet, partially on the computer while partially on a remote computer, or completely on the remote computer or server.

Additionally, although operations are described in a specific order, it should not be understood that such operations are performed in the shown specific order or in a successive order, or all of the shown operations are performed to obtain a desired result. In some cases, multi-task or parallel processing would be beneficial. Likewise, although some specific implementation details are included in the above discussion, it should not be explained as limiting the scope of any invention or claims, but should be explained as a depiction that may be directed to a specific embodiment of a specific invention. Some features described in the contexts of separate embodiments may also be consolidated and implemented in a single embodiment. Alternatively, various features depicted in the context of a single embodiment may also be scattered and implemented in a plurality of embodiments or in any appropriate sub-combinations.

Various modifications and changes to exemplary embodiments of the present disclosure will become apparent to those skilled in the art when viewing the above description along with the accompanying drawings. Any and all modifications will still fall within the scope of the non-limitative exemplary embodiments of the present disclosure. Besides, the above description and drawings have teaching benefits. Those skilled in the art related to these embodiments of the present disclosure will contemplate other embodiments of the present disclosure as illustrated here.

It would be appreciated that the embodiments of the present disclosure are not limited to specific embodiments of the present disclosure, and modifications and other embodiments should all be included within the scope of the appended claims. Although specific terms are used here, they are only used in general and descriptive senses, not for a purpose of limitation.

What is claimed is:

1. A method for determining a physical location of a device, the method comprising:
   obtaining a first address of the device; and
   based on a first mapping between the first address of the device and a location identifier of the physical location associated with the device, determining the physical location of the device;
   wherein establishing the first mapping between the first address of the device and the location identifier of the physical location comprises:
      establishing a second mapping between a device identifier of the device and the location identifier of the physical location; and
      generating the first mapping based on the second mapping;
   wherein establishing the first mapping between the first address of the device and the location identifier of the physical location comprises:
      establishing the second mapping between the device identifier of the device and the location identifier of the physical location, wherein the device identifier is obtained based on the first address of the device; and generating the first mapping based on the second mapping;
wherein generating the first mapping based on the second mapping comprises:
obtaining the device identifier of the device based on the first address of the device;
determining the location identifier of the physical location of the device based on the device identifier and the second mapping; and
generating the first mapping based on the first address and the location identifier;
wherein determining the location identifier of the physical location of the device based on the device identifier and the second mapping comprises:
writing the location identifier of the physical location of the device into the device;
wherein in response to change of the physical location of the device, updating the first mapping comprises:
obtaining a new location identifier of a new physical location of the device;
updating the second mapping using the new location identifier;
obtaining a new first address of the device; and
updating the first mapping based on the updated second mapping and the new first address:
wherein the first address of the device is an internet protocol (IP) address of the device, and wherein the location identifier of the physical location includes a multi-level description of the physical location, the location identifier being marked at the physical location in a quick response (QR) code format;
wherein the device identifier of the device uniquely identifies the device, and the device identifier is stored in the device; and
displaying the physical location.

2. An apparatus for determining a physical location of a device, the apparatus configured to:
obtain a first address of the device;
based on a first mapping between the first address of the device and a location identifier of the physical location associated with the device, determine the physical location of the device;
establish a second mapping between a device identifier of the device and the location identifier of the physical location; and
generate the first mapping based on the second mapping;
obtain the device identifier of the device based on the first address of the device;
determine the location identifier of the physical location of the device based on the device identifier and the second mapping;
generate the first mapping based on the first address and the location identifier;
wherein determining the location identifier of the physical location of the device based on the device identifier and the second mapping comprises:
writing the location identifier of the physical location of the device into the device obtain a new location identifier of a new physical location of the device;
update the second mapping using the new location identifier;
obtain a new first address of the device;
update the first mapping based on the updated second mapping and the new first address;
wherein the first address of the device is an IP address of the device, and wherein the location identifier of the physical location includes a multi-level description of the physical location, the location identifier being marked at the physical location in a quick response (QR) code format; and
wherein the device identifier of the device uniquely identifies the device, and the device identifier is stored in the device; and
displaying the physical location.

3. A computer program product for determining a physical location of a device, the computer program product comprising a non-transitory computer readable medium encoded with computer executable program code, wherein the computer executable program code enables execution across one or more processors for obtaining a first address of the device, wherein the first address of the device is an Internet Protocol (IP) address of the device, and wherein a location identifier of the physical location includes a multi-level description of the physical location, the location identifier being marked at the physical location in a quick response (QR) code format; and
based on a first mapping between the first address of the device and the location identifier of the physical location associated with the device, determining the physical location of the device;
wherein establishing the first mapping between the first address of the device and the location identifier of the physical location comprises:
establishing a second mapping between a device identifier of the device and the location identifier of the physical location, wherein the device identifier of the device uniquely identifies the device, and the device identifier is stored in the device, wherein the device identifier is obtained based on the first address of the device; and
generating the first mapping based on the second mapping and wherein generating the first mapping based on the second mapping comprises:
obtaining the device identifier of the device based on the first address of the device;
determining the location identifier of the physical location of the device based on the device identifier and the second mapping, and comprises writing the location identifier of the physical location of the device into the device; and
generating the first mapping based on the first address and the location identifier;
wherein in response to change of the physical location of the device, updating the first mapping comprises:
obtaining a new location identifier of a new physical location of the device;
updating the second mapping using the new location identifier;
obtaining a new first address of the device; and
updating the first mapping based on the updated second mapping and the new first address; and
displaying the physical location.

* * * * *